(12) United States Patent
Guo et al.

(10) Patent No.: US 11,816,175 B2
(45) Date of Patent: Nov. 14, 2023

(54) WEBPAGE ELEMENT VISIBILITY EVALUATION BASED ON POSITION AND SCROLLING ACTIONS

(71) Applicant: Content Square SAS, Paris (FR)

(72) Inventors: Antoine Guo, Paris (FR); Sylvain Cousquer, Paris (FR)

(73) Assignee: Content Square SAS, Paris (FR)

( * ) Notice: Subject to any disclaimer, the term of this patent is extended or adjusted under 35 U.S.C. 154(b) by 0 days.

(21) Appl. No.: 18/083,779

(22) Filed: Dec. 19, 2022

(65) Prior Publication Data

US 2023/0195827 A1    Jun. 22, 2023

Related U.S. Application Data

(60) Provisional application No. 63/291,805, filed on Dec. 20, 2021.

(51) Int. Cl.
| | |
|---|---|
| *G06F 3/048* | (2013.01) |
| *G06F 16/957* | (2019.01) |
| *G06F 9/451* | (2018.01) |
| *G06F 3/04847* | (2022.01) |

(52) U.S. Cl.
CPC ...... *G06F 16/9577* (2019.01); *G06F 3/04847* (2013.01); *G06F 9/451* (2018.02)

(58) Field of Classification Search
None
See application file for complete search history.

(56) References Cited

U.S. PATENT DOCUMENTS

| | | | |
|---|---|---|---|
| 2010/0095208 A1* | 4/2010 | White | H04L 67/535 715/704 |
| 2018/0124004 A1* | 5/2018 | Sun | H04L 43/16 |
| 2020/0159371 A1* | 5/2020 | Singh | G06F 40/197 |
| 2020/0272763 A1* | 8/2020 | Brannon | G06Q 30/0277 |
| 2023/0186015 A1* | 6/2023 | Doherty | G06F 3/04812 715/720 |

\* cited by examiner

*Primary Examiner* — Thanh T Vu
(74) *Attorney, Agent, or Firm* — Schwegman Lundberg & Woessner, P.A.

(57) ABSTRACT

Methods, systems, and computer programs are presented for analyzing multiple states of a webpage. One method includes operations for tracking user activity for a set of users while interacting with a webpage to obtain session replay data. Further, the method includes analyzing the session replay data to obtain states for the webpage and causing presentation of a first user interface (UI) for selecting one state. The method further includes receiving a selection of a first state and causing presentation of a second UI for configuring tracking options to track the first state while users viewing the webpage are in the first state. The method further includes receiving, in the second UI, tracking options values for the first state, analyzing views of the first state of the webpage based on the tracking options values, and causing presentation of performance metrics associated with the first state based on the analyzed views.

18 Claims, 13 Drawing Sheets

WEBPAGE ELEMENT VISIBILITY EVALUATION BASED ON POSITION AND SCROLLING ACTIONS

CROSS-REFERENCE TO RELATED APPLICATIONS

This application claims the benefit of U.S. Provisional Patent No. 63/291,805, filed Dec. 20, 2021, and entitled "Dynamic Webpage State Tracking." This provisional application is herein incorporated by reference in its entirety.

TECHNICAL FIELD

The subject matter disclosed herein generally relates to methods, systems, and machine-readable storage media for measuring website performance.

BACKGROUND

As computer systems and networks continue to present new opportunities for individuals and organizations, website operators, owners, and administrators may seek to better understand the performance of various websites and webpages. Due to the open-ended nature of web design, quantifying website performance may prove difficult, such as when webpages include one or more dynamic elements. Further, while established performance goals may provide insight into overall webpage performance, systems for discretizing performance to understand the contribution of each element of a website remain inaccessible.

BRIEF DESCRIPTION OF THE DRAWINGS

Various of the appended drawings merely illustrate example embodiments of the present disclosure and cannot be considered as limiting its scope.

DETAILED DESCRIPTION

Example methods, systems, and computer programs are directed to analyzing multiple states of a webpage. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

In one aspect, tools are provided for automatic identification of different states of a webpage, where the different states correspond to different views of the webpage based on the interaction of the user with the webpage, such as when the user selects a pull-down menu. In one aspect, session replay information is analyzed to determine the different states of the webpage. Once the states are identified, the tool allows the user to select a particular state for obtaining performance analysis of the selected state.

In another aspect, the tool allows the user to determine a scroll-level threshold, such as the pages that do not scroll to the scroll-level threshold will not be counted for the webpage performance metrics. To define if a zone has been viewed by the user, the middle position of the page is used, such that when the middle position is displayed, then the zone is considered as having been viewed by the user. A zoning application measures what is presented on the display. When the session recording is analyzed, a check is made to determine if the user scrolled to the midpoint of the webpage during the webpage session. If the midpoint was shown on the display, then the zone is considered as viewed.

One general aspect includes a method that includes operations for tracking user activity for a plurality of users while interacting with a webpage to obtain session replay data. Further, the method includes operations for analyzing the session replay data to obtain a plurality of states for the webpage, and for causing presentation of a first user interface (UI) for selecting one state from the plurality of states. The method further includes receiving a selection of a first state from the plurality of states, and causing presentation of a second UI for configuring tracking options to track the first state while users viewing the webpage are in the first state. The method further includes operations for receiving, in the second UI, tracking options values for the first state, analyzing views of the first state of the webpage based on the tracking options values, and for causing presentation of performance metrics associated with the first state based on the analyzed views.

Figure 1:
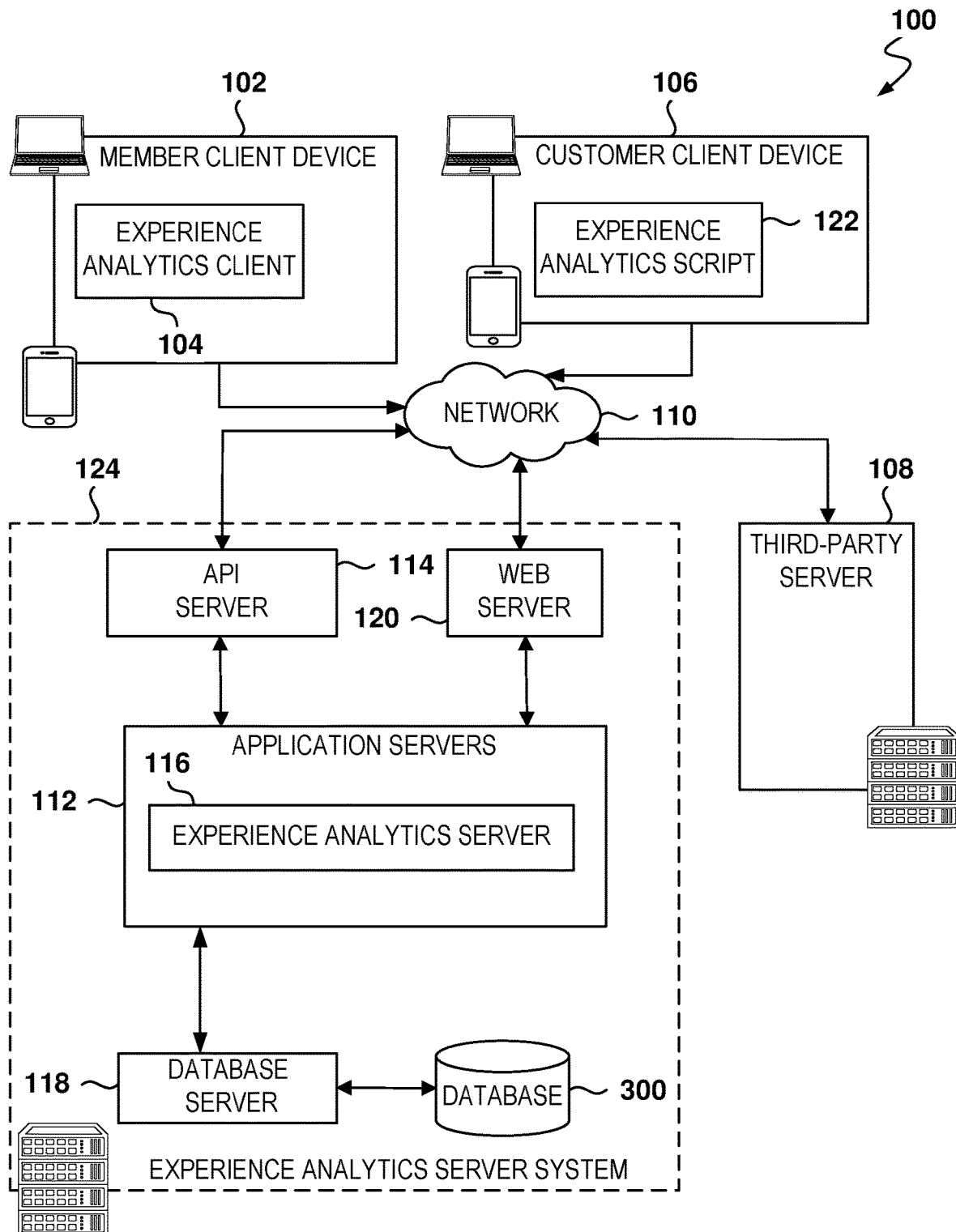
FIG. 1 is a diagrammatic representation of a networked environment in which the present disclosure may be deployed, in accordance with some examples.

FIG. 1 is a block diagram showing an example experience analytics system 100 that analyzes and quantifies the user experience of users navigating a client's website, mobile websites, and applications. The experience analytics system 100 can include multiple instances of a member client device 102, multiple instances of a customer client device 106, and multiple instances of a third-party server 108.

The member client device 102 is associated with a client of the experience analytics system 100, where the client that has a website hosted on the client's third-party server 108. For example, the client can be a retail store that has an online retail website that is hosted on a third-party server 108. An agent of the client (e.g., a web administrator, an employee, etc.) can be the user of the member client device 102.

Each of the member client devices 102 hosts a number of applications, including an experience analytics client 104. Each experience analytics client 104 is communicatively coupled with an experience analytics server system 124 and third-party servers 108 via a network 110 (e.g., the Internet). An experience analytics client 104 can also communicate with locally-hosted applications using Applications Program Interfaces (APIs).

The member client devices 102 and the customer client devices 106 can also host a number of applications including Internet browsing applications (e.g., Chrome, Safari, etc.). The experience analytics client 104 can also be implemented as a platform that is accessed by the member client device 102 via an Internet browsing application or implemented as an extension on the Internet browsing application.

Users of the customer client device 106 can access client's websites that are hosted on the third-party servers 108 via the network 110 using the Internet browsing applications. For example, the users of the customer client device 106 can navigate to a client's online retail website to purchase goods or services from the website. While the user of the customer client device 106 is navigating the client's website on an Internet browsing application, the Internet browsing application on the customer client device 106 can also execute a client-side script (e.g., JavaScript (.*js)) such as an experience analytics script 122. In one example, the experience analytics script 122 is hosted on the third-party server 108 with the client's website and processed by the Internet browsing application on the customer client device 106. The experience analytics script 122 can incorporate a scripting language (e.g., a .*js file or a .json file).

In certain examples, a client's native application (e.g., ANDROID™ or IOS™ Application) is downloaded on the customer client device 106. In this example, the client's native application including the experience analytics script 122 is programmed in JavaScript leveraging a Software Development Kit (SDK) provided by the experience analytics server system 124. The SDK includes Application Programming Interfaces (APIs) with functions that can be called or invoked by the client's native application.

In one example, the experience analytics script 122 records data including the changes in the interface of the website being displayed on the customer client device 106, the elements on the website being displayed or visible on the interface of the customer client device 106, the text inputs by the user into the website, a movement of a mouse (or touchpad or touch screen) cursor and mouse (or touchpad or touch screen) clicks on the interface of the website, etc. The experience analytics script 122 transmits the data to experience analytics server system 124 via the network 110. In another example, the experience analytics script 122 transmits the data to the third-party server 108 and the data can be transmitted from the third-party server 108 to the experience analytics server system 124 via the network 110.

An experience analytics client 104 is able to communicate and exchange data with the experience analytics server system 124 via the network 110. The data exchanged between the experience analytics client 104 and the experience analytics server system 124, includes functions (e.g., commands to invoke functions) as well as payload data (e.g., website data, texts reporting errors, insights, merchandising information, adaptability information, images, graphs providing visualizations of experience analytics, session replay videos, zoning and overlays to be applied on the website, etc.).

The experience analytics server system 124 supports various services and operations that are provided to the experience analytics client 104. Such operations include transmitting data to and receiving data from the experience analytics client 104. Data exchanges to and from the experience analytics server system 124 are invoked and controlled through functions available via user interfaces (UIs) of the experience analytics client 104.

The experience analytics server system 124 provides server-side functionality via the network 110 to a particular experience analytics client 104. While certain functions of the experience analytics system 100 are described herein as being performed by either an experience analytics client 104 or by the experience analytics server system 124, the location of certain functionality either within the experience analytics client 104 or the experience analytics server system 124 may be a design choice. For example, it may be technically preferable to initially deploy certain technology and functionality within the experience analytics server system 124 but to later migrate this technology and functionality to the experience analytics client 104 where a member client device 102 has sufficient processing capacity.

Turning now specifically to the experience analytics server system 124, an Application Program Interface (API) server 114 is coupled to, and provides a programmatic interface to, application servers 112. The application servers 112 are communicatively coupled to a database server 118, which facilitates access to a database 300 that stores data associated with experience analytics processed by the application servers 112. Similarly, a web server 120 is coupled to the application servers 112 and provides web-based interfaces to the application servers 112. To this end, the web server 120 processes incoming network requests over the Hypertext Transfer Protocol (HTTP) and several other related protocols.

The Application Program Interface (API) server 114 receives and transmits message data (e.g., commands and message payloads) between the member client device 102 and the application servers 112. Specifically, the Application Program Interface (API) server 114 provides a set of interfaces (e.g., routines and protocols) that can be called or queried by the experience analytics client 104 or the experience analytics script 122 in order to invoke functionality of the application servers 112. The Application Program Interface (API) server 114 exposes to the experience analytics client 104 various functions supported by the application servers 112, including generating information on errors, insights, merchandising information, adaptability information, images, graphs providing visualizations of experience analytics, session replay videos, zoning and overlays to be applied on the website, etc.

The application servers 112 host a number of server applications and subsystems, including for example an experience analytics server 116. The experience analytics server 116 implements a number of data processing technologies and functions, particularly related to the aggregation and other processing of data including the changes in the interface of the website being displayed on the customer client device 106, the elements on the website being displayed or visible on the interface of the customer client device 106, the text inputs by the user into the website, a movement of a mouse (or touchpad) cursor and mouse (or touchpad) clicks on the interface of the website, etc. received from multiple instances of the experience analytics script 122 on customer client devices 106. The experience analytics server 116 implements processing technologies and functions, related to generating user interfaces including information on errors, insights, merchandising information, adaptability information, images, graphs providing visualizations of experience analytics, session replay videos, zoning and overlays to be applied on the website, etc. Other processor and memory intensive processing of data may also be performed server-side by the experience analytics server 116, in view of the hardware requirements for such processing.

Figure 2:
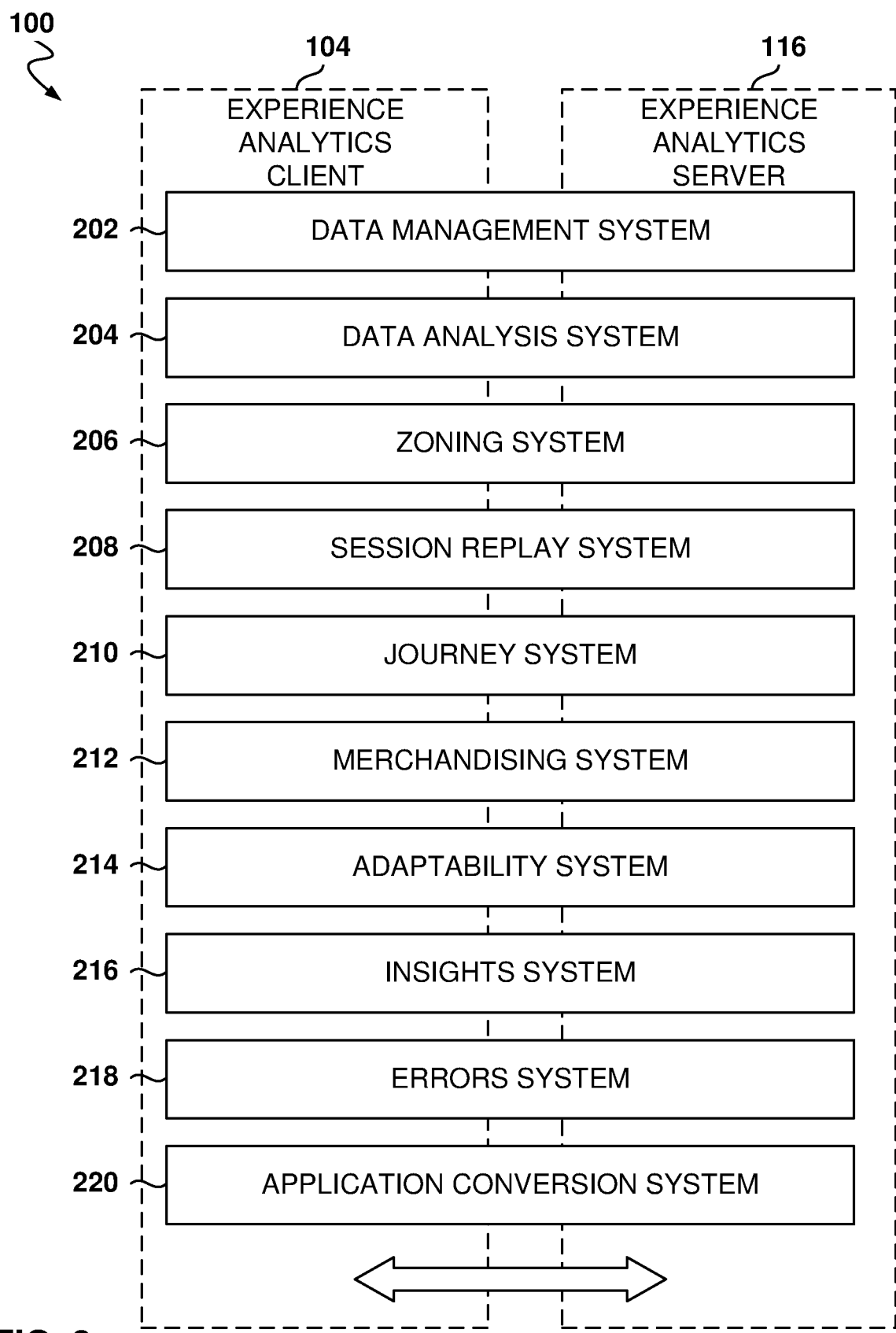
FIG. 2 is a diagrammatic representation of an experience analytics system, in accordance with some examples, that has both client-side and server-side functionality.

FIG. 2 is a block diagram illustrating further details regarding the experience analytics system 100 according to some examples. Specifically, the experience analytics system 100 is shown to comprise the experience analytics client 104 and the experience analytics server 116. The experience analytics system 100 embodies a number of subsystems, which are supported on the client-side by the experience analytics client 104 and on the server-side by the experience analytics server 116. These subsystems include, for example, a data management system 202, a data analysis system 204, a zoning system 206, a session replay system 208, a journey system 210, a merchandising system 212, an adaptability system 214, an insights system 216, an errors system 218, and an application conversion system 220.

The data management system 202 is responsible for receiving functions or data from the member client devices 102, the experience analytics script 122 executed by each of the customer client devices 106, and the third-party servers 108. The data management system 202 is also responsible for exporting data to the member client devices 102 or the third-party servers 108 or between the systems in the experience analytics system 100. The data management system 202 is also configured to manage the third-party integration of the functionalities of experience analytics system 100.

The data analysis system 204 is responsible for analyzing the data received by the data management system 202, generating data tags, performing data science and data engineering processes on the data.

The zoning system 206 is responsible for generating a zoning interface to be displayed by the member client device 102 via the experience analytics client 104. The zoning interface provides a visualization of how the users via the customer client devices 106 interact with each element on the client's website. The zoning interface can also provide an aggregated view of in-page behaviors by the users via the customer client device 106 (e.g., clicks, scrolls, navigation). The zoning interface can also provide a side-by-side view of different versions of the client's website for the client's analysis. For example, the zoning system 206 can identify the zones in a client's website that are associated with a particular element in displayed on the website (e.g., an icon, a text link, etc.). Each zone can be a portion of the website being displayed. The zoning interface can include a view of the client's website. The zoning system 206 can generate an overlay including data pertaining to each of the zones to be overlaid on the view of the client's website. The data in the overlay can include, for example, the number of views or clicks associated with each zone of the client's website within a period of time, which can be established by the user of the member client device 102. In one example, the data can be generated using information from the data analysis system 204.

The session replay system 208 is responsible for generating the session replay interface to be displayed by the member client device 102 via the experience analytics client 104. The session replay interface includes a session replay that is a video reconstructing an individual visitor session on the client's website. For example, a user visiting the client's website on a customer client device 106 can be reconstructed from the data received from the user's experience analytics script 122 on customer client devices 106. The session replay interface can also include the session replays of a number of different visitor sessions to the client's website within a period of time (e.g., a week, a month, a quarter, etc.). The session replay interface allows the client via the member client device 102 to select and view each of the session replays. In one example, the session replay interface can also include an identification of events (e.g., failed conversion, angry customers, errors in the website, recommendations or insights) that are displayed and allow the user to navigate to the part in the session replay corresponding to the events such that the client can view and analyze the event.

The journey system 210 is responsible for generating the journey interface to be displayed by the member client device 102 via the experience analytics client 104. The journey interface includes a visualization of how the visitors progress through the client's website, page-by-page, from entry onto the website to the exit (e.g., in a session). The journey interface can include a visualization that provides a customer journey mapping (e.g., sunburst visualization). This visualization aggregates the data from all of the visitors (e.g., users on different customer client devices 106) to the website and illustrates the visited pages and in order in which the pages were visited. The client viewing the journey interface on the member client device 102 can identify anomalies such as looping behaviors and unexpected drop-offs. The client viewing the journey interface can also assess the reverse journeys (e.g., pages visitors viewed before arriving at a particular page). The journey interface also allows the client to select a specific segment of the visitors to be displayed in the visualization of the customer journey.

The merchandising system 212 is responsible for generating the merchandising interface to be displayed by the member client device 102 via the experience analytics client 104. The merchandising interface includes merchandising analysis that provides the client with analytics on: the merchandise to be promoted on the website, optimization of sales performance, the items in the client's product catalog on a granular level, competitor pricing, etc. The merchandising interface can, for example, comprise graphical data visualization pertaining to product opportunities, category, brand performance, etc. For instance, the merchandising interface can include the analytics on conversions (e.g., sales, revenue) associated with a placement or zone in the client website.

The adaptability system 214 is responsible for creating accessible digital experiences for the client's website to be displayed by the customer client devices 106 for users that would benefit from an accessibility-enhanced version of the client's website. For instance, the adaptability system 214 can improve the digital experience for users with disabilities, such as visual impairments, cognitive disorders, dyslexia, and age-related needs. The adaptability system 214 can, with proper user permissions, analyze the data from the experience analytics script 122 to determine whether an accessibility-enhanced version of the client's website is needed, and can generate the accessibility-enhanced version of the client's website to be displayed by the customer client device 106.

The insights system 216 is responsible for analyzing the data from the data management system 202 and the data analysis system 204 surface insights that include opportunities as well as issues that are related to the client's website. The insights can also include alerts that notify the client of deviations from a client's normal business metrics. The insights can be displayed by the member client devices 102 via the experience analytics client 104 on a dashboard of a user interface, as a pop-up element, as a separate panel, etc. In this example, the insights system 216 is responsible for generating an insights interface to be displayed by the member client device 102 via the experience analytics client 104. In another example, the insights can be incorporated in another interface such as the zoning interface, the session replay, the journey interface, or the merchandising interface to be displayed by the member client device 102.

The errors system 218 is responsible for analyzing the data from the data management system 202 and the data analysis system 204 to identify errors that are affecting the visitors to the client's website and the impact of the errors on the client's business (e.g., revenue loss). The errors can include the location within the user journey in the website and the page that adversely affects (e.g., causes frustration for) the users (e.g., users on customer client devices 106 visiting the client's website). The errors can also include causes of looping behaviors by the users, in-page issues such as unresponsive calls to action and slow loading pages, etc. The errors can be displayed by the member client devices 102 via the experience analytics client 104 on a dashboard of a user interface, as a pop-up element, as a separate panel, etc. In this example, the errors system 218 is responsible for generating an errors interface to be displayed by the member client device 102 via the experience analytics client 104. In another example, the insights can be incorporated in another interface such as the zoning interface, the session replay, the journey interface, or the merchandising interface to be displayed by the member client device 102.

The application conversion system 220 is responsible for the conversion of the functionalities of the experience analytics server 116 as provided to a client's website to a client's native mobile applications. For instance, the application conversion system 220 generates the mobile application version of the zoning interface, the session replay, the journey interface, the merchandising interface, the insights interface, and the errors interface to be displayed by the member client device 102 via the experience analytics client 104. The application conversion system 220 generates an accessibility-enhanced version of the client's mobile application to be displayed by the customer client devices 106.

In some embodiments, the data analysis system 204 uses session replay information of the session replay system 208 to determine multiple states of a webpage. Further, the data analysis system 204 provides utilities for analyzing the multiple states. Once the user selects one of the states, the insights system 216 provides information about the state, such as the actions on the webpage (e.g., click on a pull-down menu) that generated the state and information about the state (e.g., statistics on the use of the webpage.

In one aspect, the data analysis system 204 provides option for defining scroll levels to determine when a page is considered for generating insights, such as the percentage of the webpage that must be scroll down (e.g., viewed) by the user to consider the page when calculating view statistics and other metrics.

Figure 3:
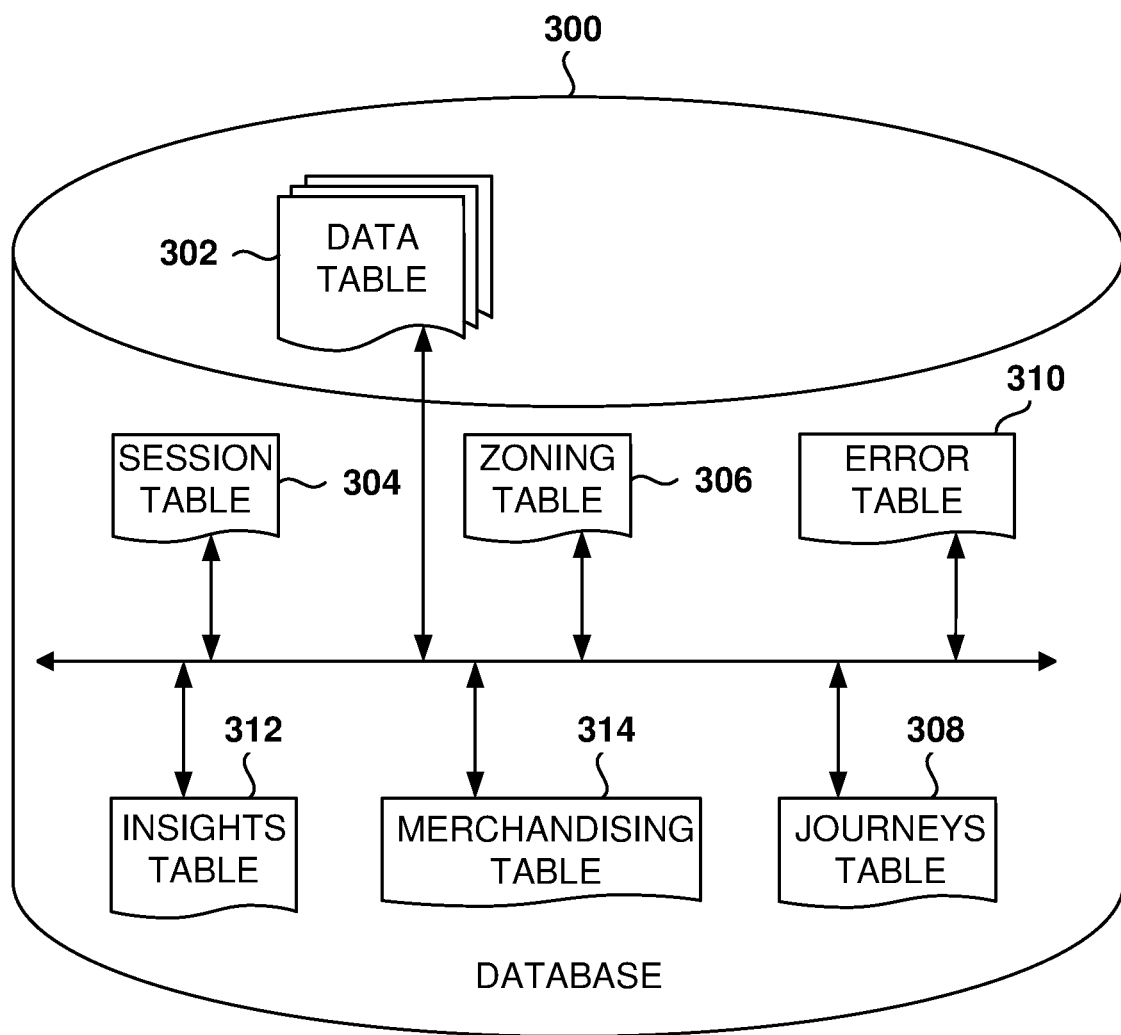
FIG. 3 is a diagrammatic representation of a data structure as maintained in a database, in accordance with some examples.

FIG. 3 is a schematic diagram illustrating database 300, which may be stored in the database 300 of the experience analytics server 116, according to certain examples. While the content of the database 300 is shown to comprise a number of tables, it will be appreciated that the data could be stored in other types of data structures (e.g., as an object-oriented database).

The database 300 includes a data table 302, a session table 304, a zoning table 306, an error table 310, an insights table 312, a merchandising table 314, and a journeys table 308.

The data table 302 stores data regarding the websites and native applications associated with the clients of the experience analytics system 100. The data table 302 can store information on the contents of the website or the native application, the changes in the interface of the website being displayed on the customer client device 106, the elements on the website being displayed or visible on the interface of the customer client device 106, the text inputs by the user into the website, a movement of a mouse (or touchpad or touch screen) cursor and mouse (or touchpad or touch screen) clicks on the interface of the website, etc. The data table 302 can also store data tags and results of data science and data engineering processes on the data. The data table 302 can also store information such as the font, the images, the videos, the native scripts in the website or applications, etc.

The session table 304 stores session replays for each of the client's websites and native applications.

The zoning table 306 stores data related to the zoning for each of the client's websites and native applications including the zones to be created and the zoning overlay associated with the websites and native applications.

The journeys table 308 stores data related to the journey of each visitor to the client's website or through the native application.

The error table 310 stores data related to the errors generated by the errors system 218 and the insights table 312 stores data related to the insights generated by the insights table 312.

The merchandising table 314 stores data associated with the merchandising system 212. For example, the data in the merchandising table 314 can include the product catalog for each of the clients, information on the competitors of each of the clients, the data associated with the products on the websites and applications, the analytics on the product opportunities and the performance of the products based on the zones in the website or application, etc.

Figure 4:
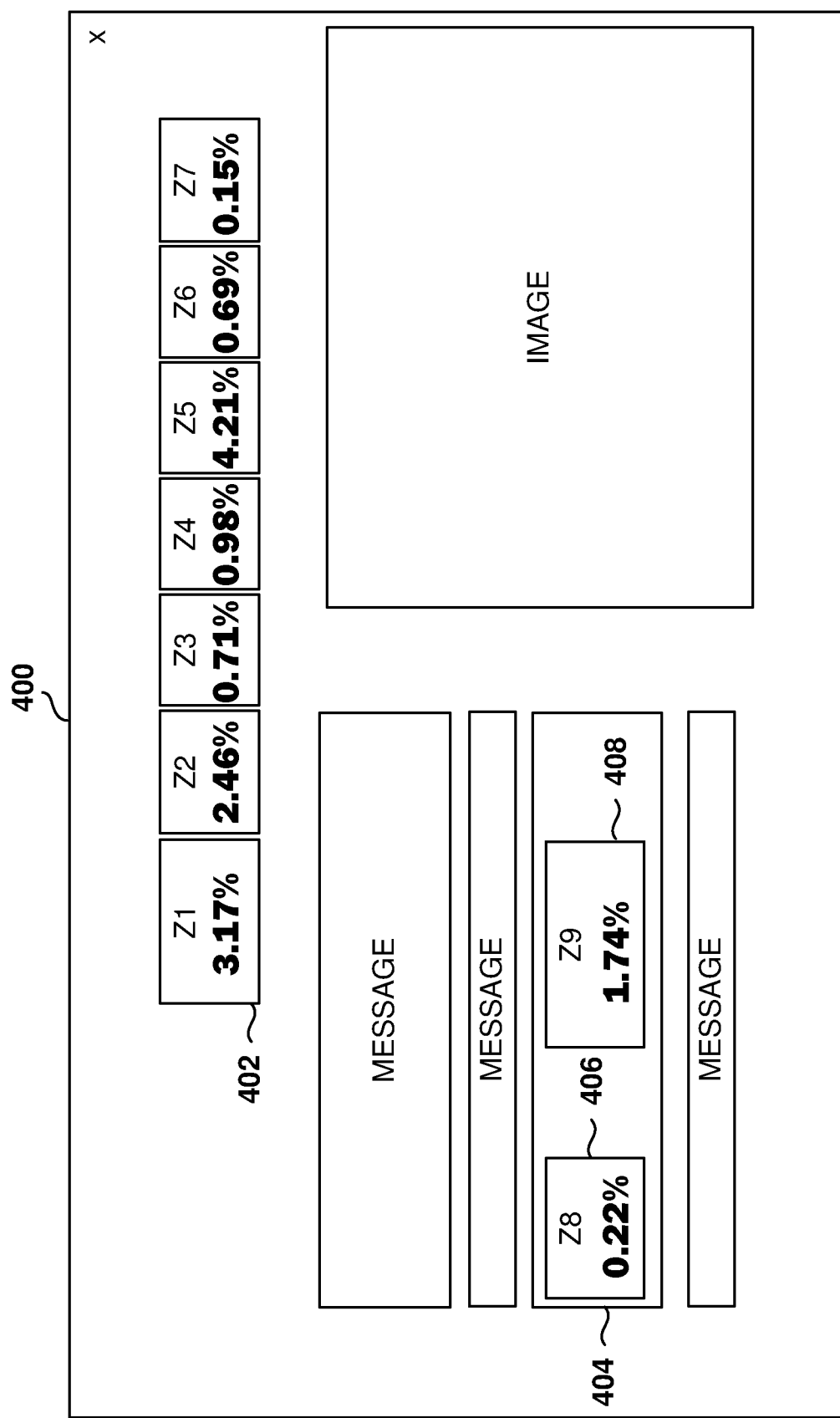
FIG. 4 is a user interface (UI) for presenting a webpage with performance information for zones in the webpage, according to some example embodiments.

FIG. 4 is a user interface (UI) 400 for presenting a webpage with performance information for zones in the webpage, according to some example embodiments. As discussed above, zones refer to the various content elements, fields, and other web components, that form the user-facing portions of a webpage or website. As an example, an online shopping website may include a search bar, a "go to cart" button, and a "home page" button, where the search bar and the various buttons are each webpage zones.

Performance metrics refer to various quantifiable factors related to goal achievement. As an example, where a given goal targets a fifteen percent newsletter sign-up rate, a corresponding performance metric may be the percentage of site visitors clicking on a "subscribe to newsletter" button. An example metric of interest is an "average hover time," describing the average amount of time for which users hover the mouse cursor over given elements of the webpage.

With regard to zones (e.g., zone 402, 404, 406, 408), metrics may be overlayed on the zones for an easy way to compare zone metrics.

The zone metrics include hover rate, click recurrence, attractiveness rate, exposure rate, and exposure time, but other metrics may also be included.

The hover rate is an average time spent hovering over the zone. The click recurrence is the average number of clicks on the zone for page views with at least one click on the zone. The attractiveness rate is the percentage of page views where the zone was visible on the screen with at least one click on the zone. The exposure rate is the percentage of page views where at least half of the zone was visible on the screen, and the exposure rate indicates how far the users are scrolling. Further, the exposure time is the average time with at least half of the zone is visible on the screen and indicates how long the zone is visible.

In the illustrated example in FIG. 4, the click recurrence for each zone is shown over imposed over the zone. For example, zone 402 shows that 2.34% of the users that view the zone click on the zone. Zones may also include other zones within, such as zone 404 that includes zones 406 (click recurrence of 0.22%) and zone 408 (click recurrence of 1.74%).

With regards to the exposure rate, in some example embodiments, the test of whether a user views the zone is that the user views at least the top half of the zone, that is, the vertical middle point of the zone is exposed to the user. In other example embodiments, a threshold is defined for determine when the zone is exposed, such as 75%, which would mean at least three quarters of the zone would have to be exposed to the user to consider the zone exposed. The threshold may be configured by the user.

Figure 5A:
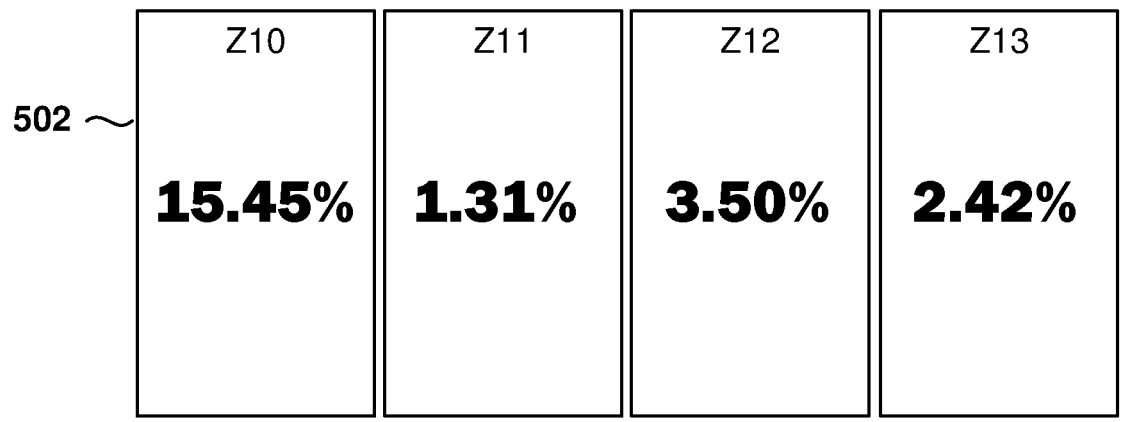
FIGS. 5A-5B illustrate the presentation of zone information for nested zones, according to some example embodiments.
Figure 5B:
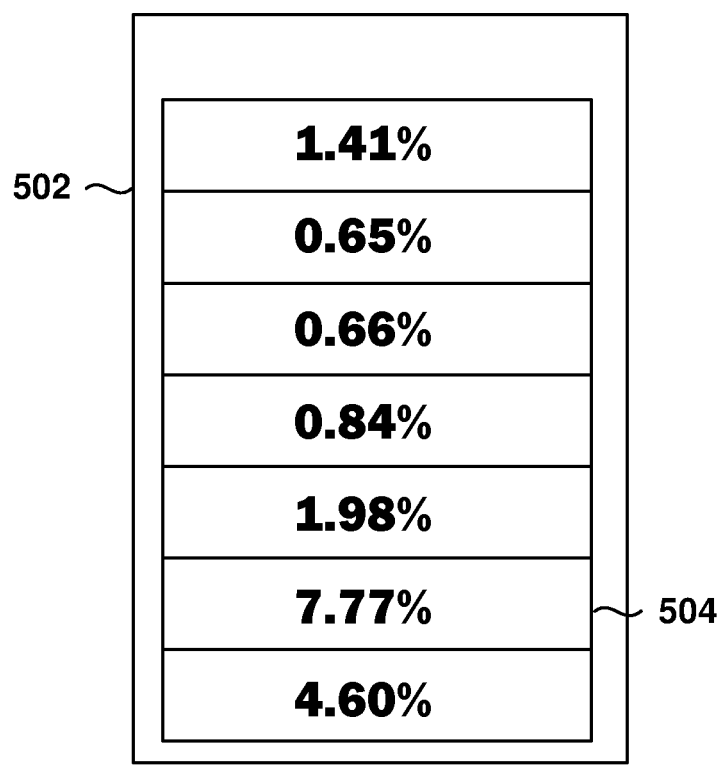

FIGS. 5A-5B illustrate the presentation of zone information for nested zones, according to some example embodiments. FIG. 5A shows a portion of a UI that covers the bottom of the webpage, and include several zones like About US Z10 502, Partners Z11, Support Z12, and Privacy Center Z13.

In this example, the About-Us Z10 zone 502 has a higher click rate of 15.45% than the other zones. Typically, zones at the bottom of the webpage tend to have less clicks, so the high click rate for About-Us zone Z10 502 is unusual.

If the user wants to know more details, the user can click on the About-Us Z10 zone 502 and the UI of FIG. 5B will show About-Us Z10 zone 502 with the embedded zones inside and their corresponding metrics. The example shows high click rates for the Careers zone 504 and Job Opportunities that explain the high click rate for the About-Us Z10 zone 502.

Figure 6:
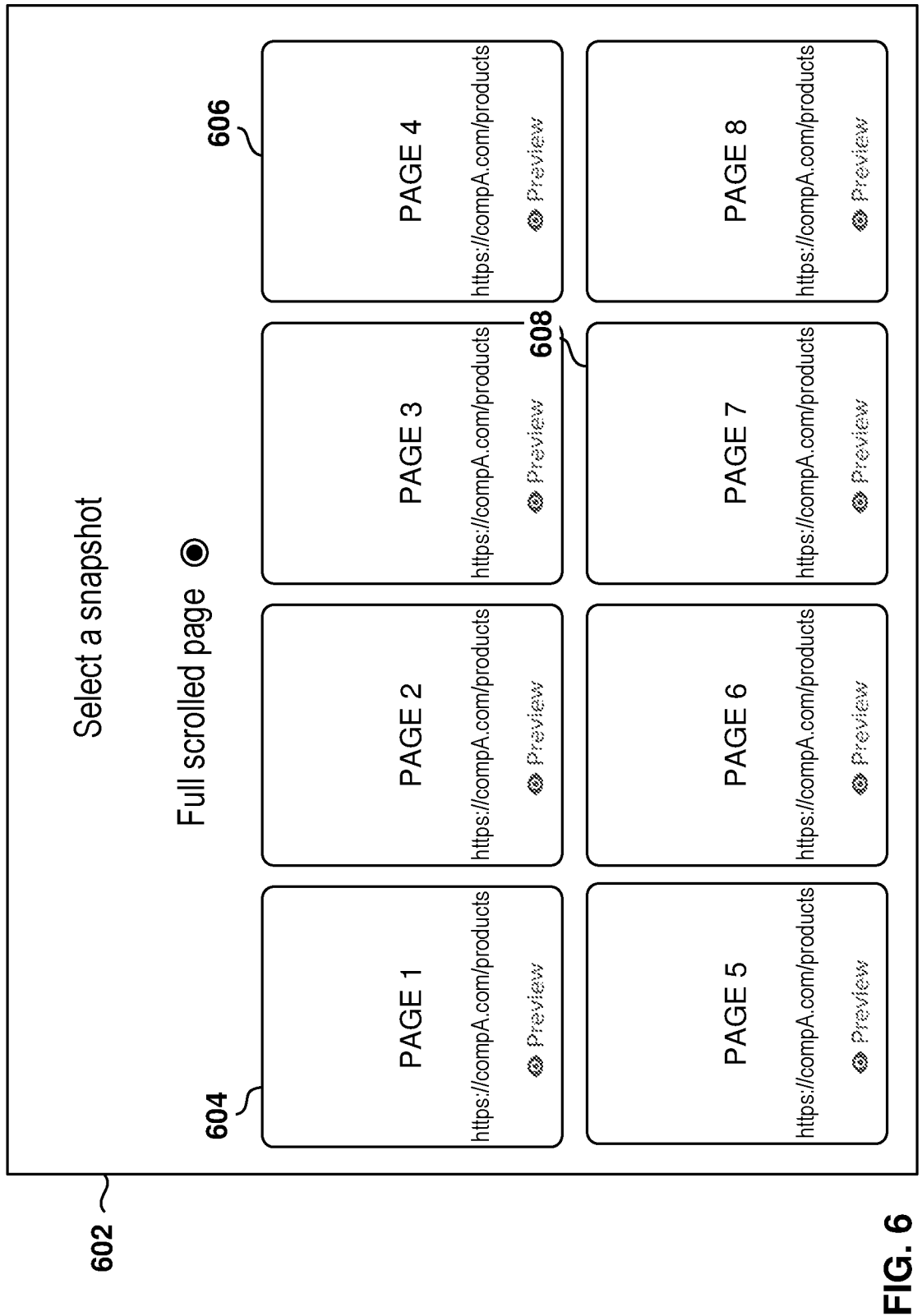
FIG. 6 is a UI for showing different versions of a webpage, according to some example embodiments.

FIG. 6 is a UI 602 for showing different versions of a webpage, according to some example embodiments. The same webpage may look different at different times based on how users interact with the webpage, such as when the user activates a pulldown menu. The different views are referred to herein as states of the webpage.

The experience analytics system provides tools for analyzing the different states of the webpage to understand the user interactions, e.g., noting which elements are used more often to get to a particular state. In some example embodiments, the experience analytics system analyzes the views from users of a webpage based on the session-replay data to identify the different states.

The experience analytics system analyzes searches the session-replay data to determine sessions corresponding to the webpage. Then the experience analytics system initializes a list of the states with the first webpage in the determined sessions. The experience analytics system then checks each session and if the session has a state not in the list, the experience analytics system adds the state to the list. At the end, after checking the sessions for the webpage, the list includes the webpage states.

Additionally, as the experience analytics system analyzes the session-replay data, the experience analytics system keeps statistics on the states, such as the number of instances found, dates when accessed, clicks, etc. In other embodiments, particularly when the number of sessions is very large, the experience analytics system analyzes a subset of the sessions for the page to obtain a sampling of the states.

Further, in some example embodiments, the automatic detection of states is performed for the views within a predefined time period, which helps in discarding old data that may include older versions of the webpage.

FIG. 6 shows the UI 602 with multiple states of the same webpage, such as state 604 corresponding to the initial view, state 606 when the user has selected a menu associated with one of the products shown in the webpage, and state 608 for a user selection of a different menu. The experience analytics system is able to retroactively look at webpage views to determine the different states.

The experience analytics system provides tools for analyzing each of the states, such as by editing each page state (e.g., to define zones), and provide individual metrics for each of the page states. This is referred to as dynamic webpage state because the webpage may be analyzed as the webpage state changes, and the different states of the webpage may be tracked, analyzed, and reported. Other solutions simply analyze one state of the webpage and does not account for the interactions of the user with the webpage.

Having multiple states enable users to analyze user interactions with elements of the webpage, such as menus and popups. The user can select the specific state that they want to analyze and see how the users interacts with each particular state.

Figure 7:
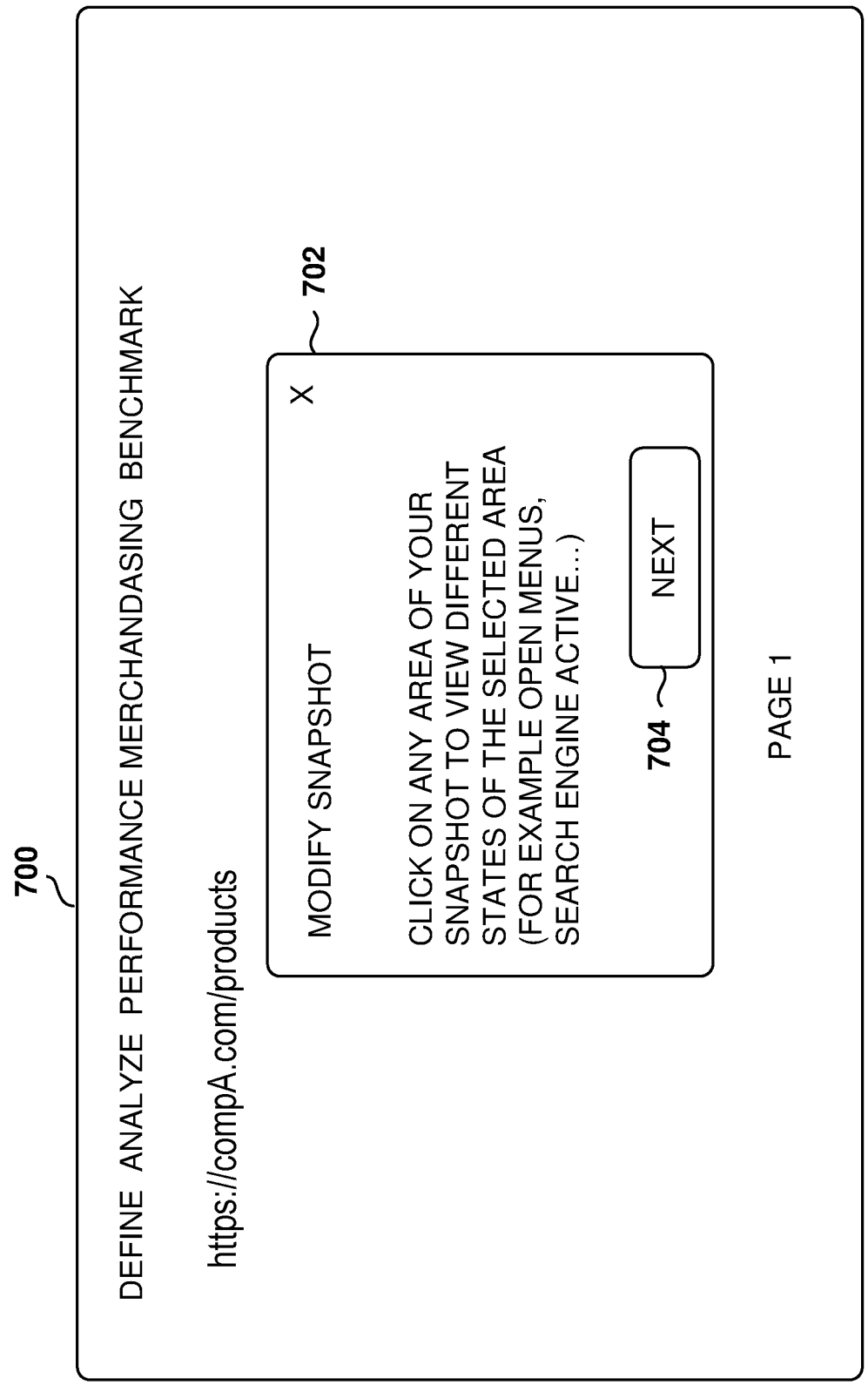
FIG. 7 is a UI for selecting a state of a webpage, according to some example embodiments.

FIG. 7 is a UI 700 for selecting the state of a webpage, according to some example embodiments. After selecting the state in the UI 602 of FIG. 6, the UI 700 is presented, which includes a Modify-snapshot window 702, with information for the user indicating that the user may click on areas of the webpage, referred to also as a snapshot, to view the different elements (e.g., zones) of the selected are, such as menus, active search engine, buttons, etc. After the user selects the Next button 704, the UI of FIG. 8 is presented.

Figure 8:
FIG. 8 is a UI for presenting information on the selected state, according to some example embodiments.

FIG. 8 is a UI 802 for presenting information on the selected state, according to some example embodiments. When the user clicks on any area of the UI 802, such as area 804 for Featured option, the experience analytics system provides additional options for working with the website state and the different zones. If the user selects on the Featured option, the UI will display the page states associated with the selected Featured option, including the website states that result from interacting with this option.

The user may then select a webpage state for analysis, and the choice is stored in the database. For example, the user may select zones for this particular webpage state for analysis. This will result in analysis performed for the selected webpage, such as getting statistics for the selected state, similar to the statistics shown in FIGS. 4 and 5A-5B. The metrics may be stored in the database 300 of FIG. 3.

Figure 9:
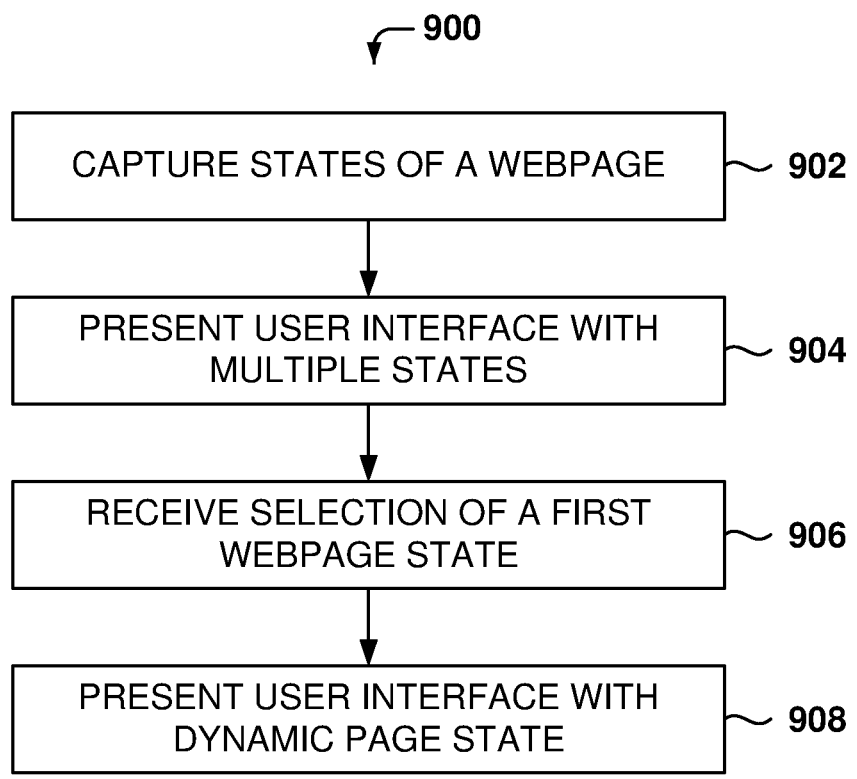
FIG. 9 is a flowchart of a method for presenting dynamic page states, according to some example embodiments.

FIG. 9 is a flowchart of a method 900 for presenting dynamic page states, according to some example embodiments. While the various operations in this flowchart are presented and described sequentially, one of ordinary skill will appreciate that some or all of the operations may be executed in a different order, be combined or omitted, or be executed in parallel.

At operation 902, the states of a webpage are captured. For example, the sessions of users interacting with the webpage are analyzed to discover one or more of the states for the webpage. A state refers to a unique view of the webpage, where different states differ by at least one element of the webpage. For example, one state may include the initial webpage presented to the user, another state the webpage with a menu selected, another state with a popup presented to the user, etc.

From operation 902, the method 900 flows to operation 904 where a UI is presented for selecting from the multiple states of a webpage. One example is presented in FIG. 6.

From operation 904, the method 900 flows to operation 906 where a selection of the first webpage state is received. In response to the selection, at operation 908, a user interface is presented with the selected webpage state, also referred to as the dynamic webpage state.

Once the state is selected, the user is able to define zones and configure other parameters for tracking of the particular webpage state. Thus, the statistics for the first webpage state are updated when the user is viewing the first state, but not when the user is viewing another state of the same webpage.

Figure 10:
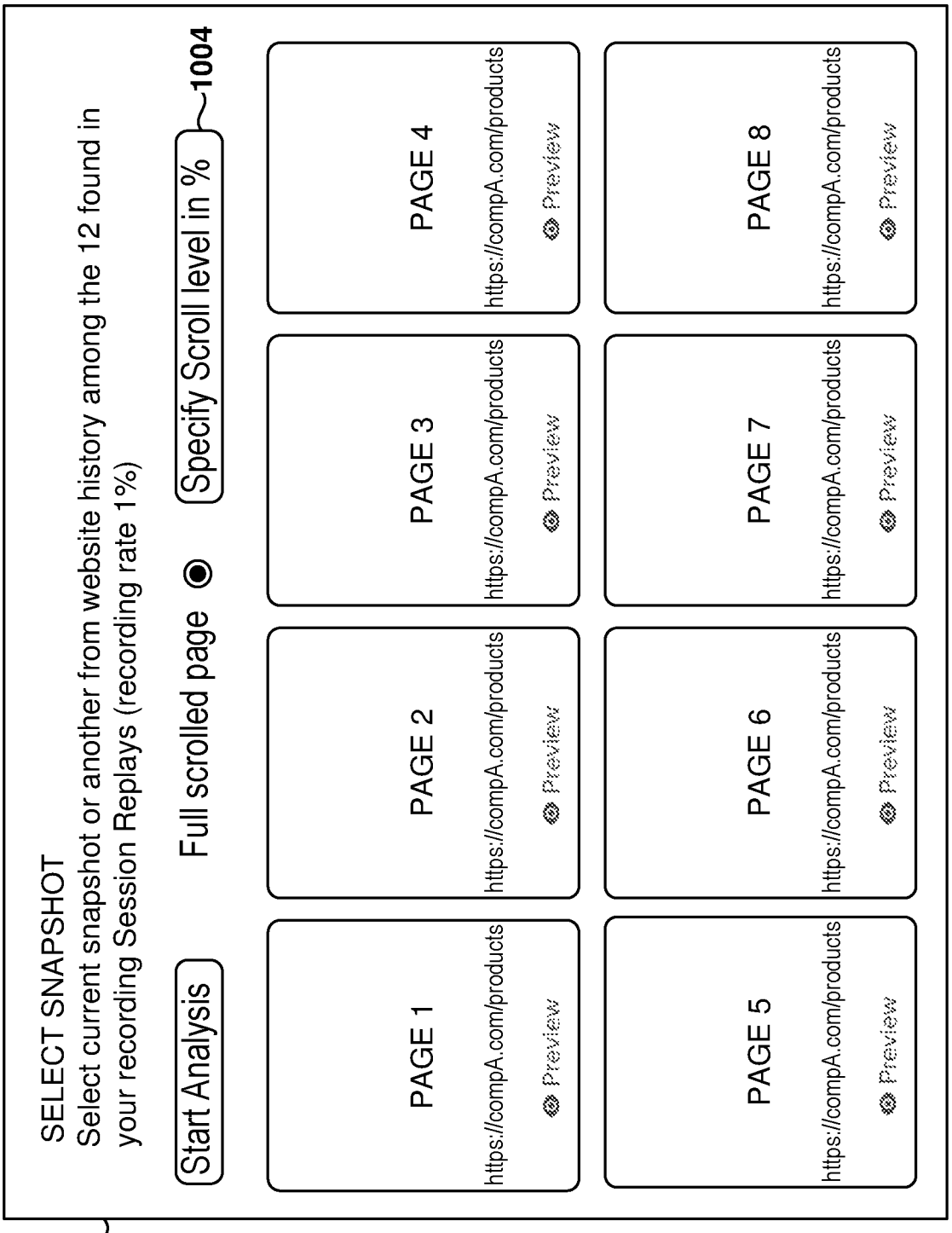
FIG. 10 is a UI with options for configuring the collection of data for a webpage based on the scroll level, according to some example embodiments.

FIG. 10 is a UI 1002 with options for configuring the collection of data for a webpage based on the scroll level, according to some example embodiments. Some webpages are long, so users have to scroll down the webpage to see the complete webpage. For these long webpages analyzing the elements at the bottom of the page may be difficult since sometimes these elements at the bottom are not even exposed to the user. Thus, metrics such as exposure rate and exposure time may not be accurate for these unseen zones.

In some example embodiments, the configurable scroll-level threshold allows the user the define when a webpage is considered exposed to the user for calculating metrics. When the scroll level of a view of the page meets or exceed the scroll threshold level, then the view is considered for the analysis of the page, but if the scroll threshold level is not met, then the view is not included in the analysis for calculating metrics.

The UI 1002 includes a selectable button to select the full scrolled page (e.g., the whole page has been exposed to the user) as the scroll threshold level. If the user selects the full-scrolled-page option, then views considered are those views that expose the bottom of the page at some point after the user scrolls down the webpage.

If the user does not select the full-scrolled-page option, then the user may enter the desired scroll level threshold in entry field 1004. Thus, the views considered will be those views that meet the threshold. For example, if the user selects 80% as the threshold level, the view of the page will be considered for analysis when at least 80% of the page is exposed to the user. Otherwise, the view will not be part of the metrics for the webpage.

Figure 11:
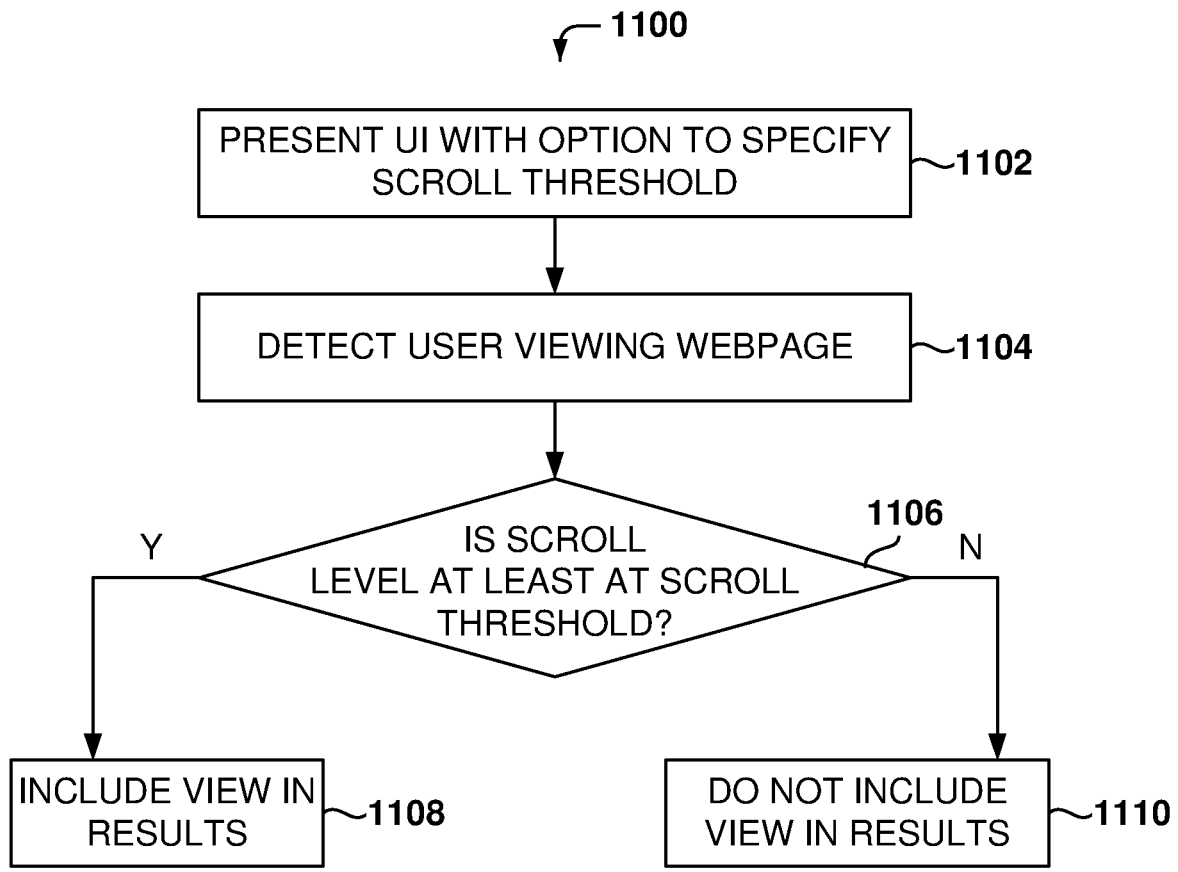
FIG. 11 is a flowchart of a method for configuring data collection of the webpage, according to some example embodiments.

FIG. 11 is a flowchart of a method 1100 for configuring data collection of the webpage, according to some example embodiments. At operation 1102, a UI (e.g., UI 1002) is presented, where the UI includes an option for specifying the scroll threshold.

From operation 1102, the method flows to operation 1104, where the experience analytics system detects when users view the webpage. For each view, a check 1106 is made to determine if the scroll level while viewing the webpage is greater than or equal to the scroll threshold configured for the webpage.

If the scroll level during the view is greater than or equal to the configured scroll threshold, the method 1100 flows to operation 1108, and if the scroll level during the view less than the configured scroll threshold, the method 1100 flows to operation 1110.

At operation 1108, each page view that meets the scroll threshold is included in the tracking and the results presented for the webpage. At operation 1110, each page is not included in the tracking and will not affect the results presented for the webpage.

Figure 12:
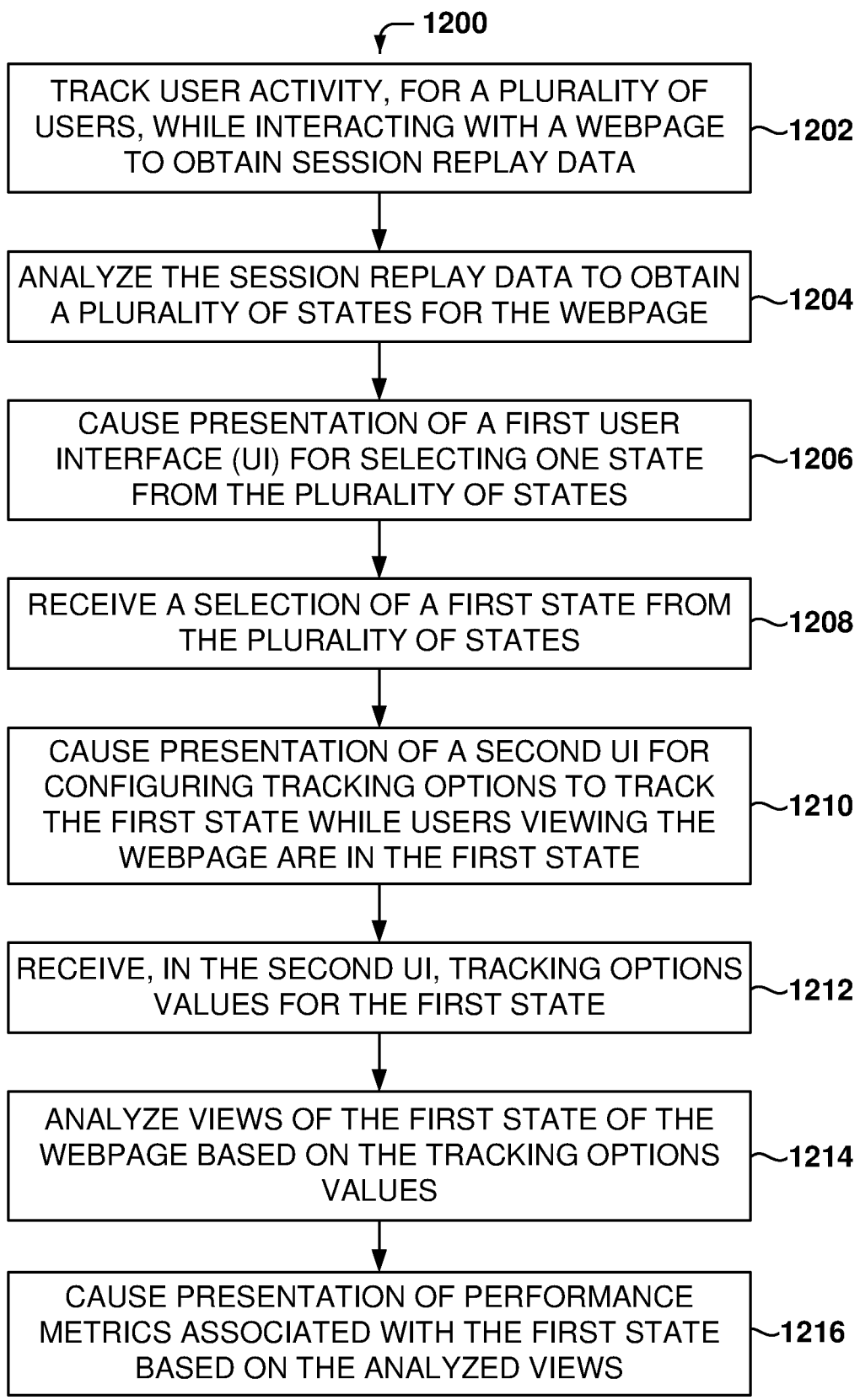
FIG. 12 is a flowchart of a method for analyzing multiple states of a webpage, according to some example embodiments.

FIG. 12 is a flowchart of a method 1200 for analyzing multiple states of a webpage, according to some example embodiments. While the various operations in this flowchart are presented and described sequentially, one of ordinary skill will appreciate that some or all of the operations may be executed in a different order, be combined or omitted, or be executed in parallel.

Operation 1202 is for tracking user activity for a plurality of users while interacting with a webpage to obtain session replay data.

From operation 1202, the method 1200 flows to operation 1204 to analyze the session replay data to obtain a plurality of states for the webpage.

From operation 1204, the method 1200 flows to operation 1206 for causing presentation of a first user interface (UI) for selecting one state from the plurality of states.

Further, from operation 1206, the method 1200 flows to operation 1208 for receiving a selection of a first state from the plurality of states.

From operation 1208, the method 1200 flows to operation 1210 for causing presentation of a second UI for configuring tracking options to track the first state while users viewing the webpage are in the first state.

From operation 1210, the method 1200 flows to operation 1212 to receiving, in the second UI, tracking options values for the first state.

Further, from operation 1212, the method 1200 flows to operation 1214 to analyze views of the first state of the webpage based on the tracking options values.

From operation 1214, the method 1200 flows to operation 1216 for causing presentation of performance metrics associated with the first state based on the analyzed views.

In one example, each state corresponds to a different view of the webpage based on interactions of the users with the webpage.

In one example, a first state corresponds to an initial view of the webpage when loaded on a browser, wherein a second state corresponds to a view of the webpage after selection of a menu in the webpage.

In one example, the tracking options comprises a configurable scroll-level threshold to define when a webpage is considered exposed to the user for calculating the performance metrics.

In one example, the performance metrics comprise an exposure rate, wherein a zone is considered as being exposed when a vertical middle point of the zone is presented on the user interface.

In one example, the performance metrics comprise a percentage of users selecting an option to subscribe to a newsletter, wherein the performance metrics comprise an average hover time describing an average amount of time a mouse cursor hovers over a zone.

In one example, each zone refers to content elements, fields, and other web components that form user-facing portions of the webpage.

In one example, causing presentation of the performance metrics comprises overlaying a value of at least one performance metric over a zone on the webpage.

In one example, causing presentation of the performance metrics comprises presenting zone information for zones nested inside another zone in the webpage.

In one example, causing presentation of the first UI for selecting one state from the plurality of states comprises presenting the plurality of states in the first UI, and enabling a selection of any of the presented states.

Another general aspect is for a system that includes a memory comprising instructions and one or more computer processors. The instructions, when executed by the one or more computer processors, cause the one or more computer processors to perform operations comprising: tracking user activity for a plurality of users while interacting with a webpage to obtain session replay data; analyzing the session replay data to obtain a plurality of states for the webpage; causing presentation of a first user interface (UI) for selecting one state from the plurality of states; receiving a selection of a first state from the plurality of states; causing presentation of a second UI for configuring tracking options to track the first state while users viewing the webpage are in the first state; receiving, in the second UI, tracking options values for the first state; analyzing views of the first state of the webpage based on the tracking options values; and causing presentation of performance metrics associated with the first state based on the analyzed views.

In yet another general aspect, a machine-readable storage medium (e.g., a non-transitory storage medium) includes instructions that, when executed by a machine, cause the machine to perform operations comprising: tracking user activity for a plurality of users while interacting with a webpage to obtain session replay data; analyzing the session replay data to obtain a plurality of states for the webpage; causing presentation of a first user interface (UI) for selecting one state from the plurality of states; receiving a selection of a first state from the plurality of states; causing presentation of a second UI for configuring tracking options to track the first state while users viewing the webpage are in the first state; receiving, in the second UI, tracking options values for the first state; analyzing views of the first state of the webpage based on the tracking options values; and causing presentation of performance metrics associated with the first state based on the analyzed views.

Figure 13:
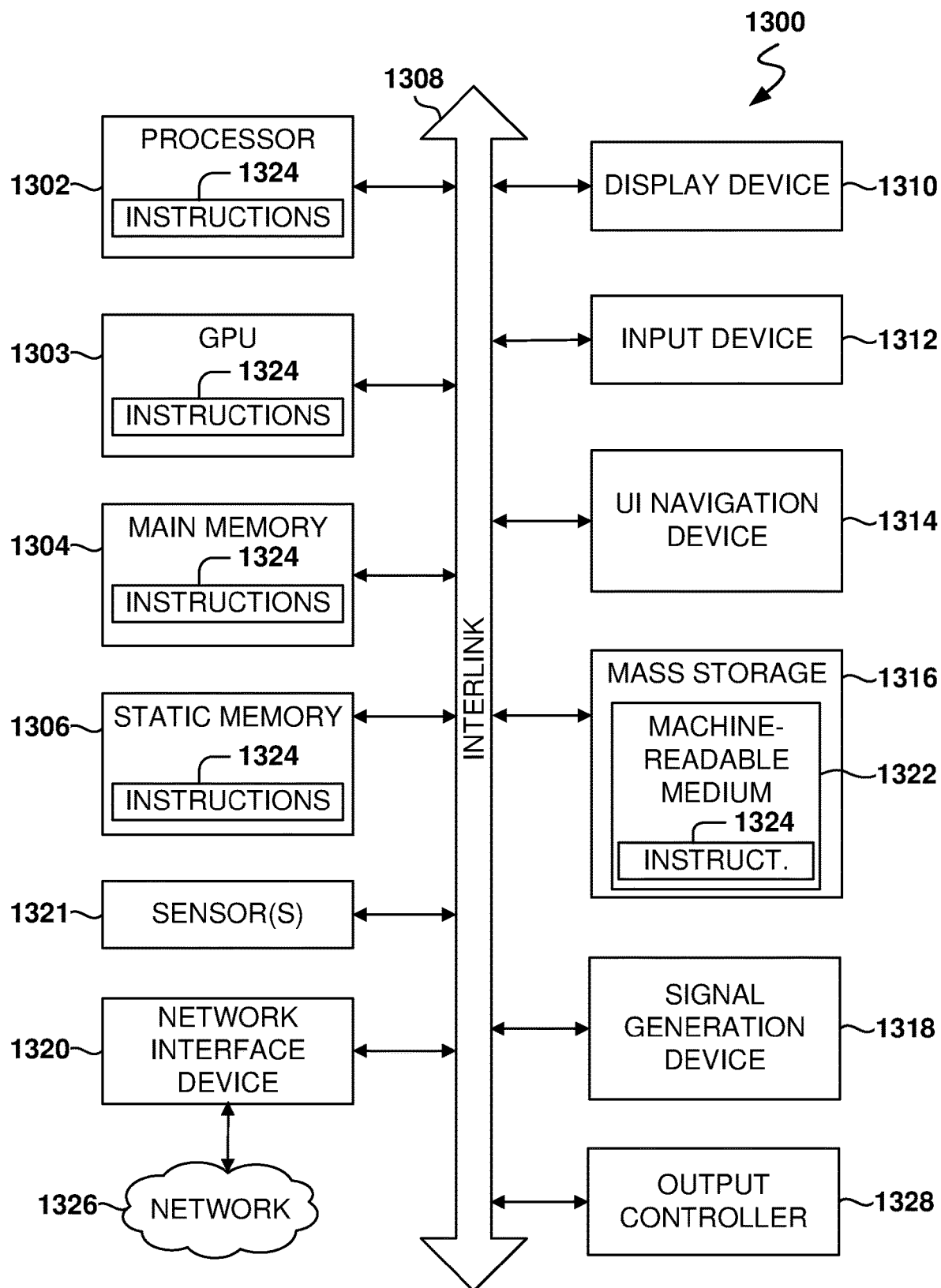
FIG. 13 is a block diagram illustrating an example of a machine upon or by which one or more example process embodiments described herein may be implemented or controlled.

FIG. 13 is a block diagram illustrating an example of a machine 1300 upon or by which one or more example process embodiments described herein may be implemented or controlled. In alternative embodiments, the machine 1300 may operate as a standalone device or may be connected (e.g., networked) to other machines. In a networked deployment, the machine 1300 may operate in the capacity of a server machine, a client machine, or both in server-client network environments. In an example, the machine 1300 may act as a peer machine in a peer-to-peer (P2P) (or other distributed) network environment. Further, while only a single machine 1300 is illustrated, the term "machine" shall also be taken to include any collection of machines that individually or jointly execute a set (or multiple sets) of instructions to perform any one or more of the methodologies discussed herein, such as via cloud computing, software as a service (SaaS), or other computer cluster configurations.

Examples, as described herein, may include, or may operate by, logic, a number of components, or mechanisms. Circuitry is a collection of circuits implemented in tangible entities that include hardware (e.g., simple circuits, gates, logic). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits) including a computer-readable medium physically modified (e.g., magnetically, electrically, by moveable placement of invariant massed particles) to encode instructions of the specific operation. In connecting the physical components, the underlying electrical properties of a hardware constituent are changed (for example, from an insulator to a conductor or vice versa). The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry, at a different time.

The machine (e.g., computer system) 1300 may include a hardware processor 1302 (e.g., a central processing unit (CPU), a hardware processor core, or any combination thereof), a graphics processing unit (GPU) 1303, a main memory 1304, and a static memory 1306, some or all of which may communicate with each other via an interlink (e.g., bus) 1308. The machine 1300 may further include a display device 1310, an alphanumeric input device 1312 (e.g., a keyboard), and a user interface (UI) navigation device 1314 (e.g., a mouse). In an example, the display device 1310, alphanumeric input device 1312, and UI navigation device 1314 may be a touch screen display. The machine 1300 may additionally include a mass storage device (e.g., drive unit) 1316, a signal generation device 1318 (e.g., a speaker), a network interface device 1320, and one or more sensors 1321, such as a Global Positioning System (GPS) sensor, compass, accelerometer, or another sensor. The machine 1300 may include an output controller 1328, such as a serial (e.g., universal serial bus (USB)), parallel, or other wired or wireless (e.g., infrared (IR), near field communication (NFC)) connection to communicate with or control one or more peripheral devices (e.g., a printer, card reader).

The mass storage device 1316 may include a machine-readable medium 1322 on which is stored one or more sets of data structures or instructions 1324 (e.g., software) embodying or utilized by any one or more of the techniques or functions described herein. The instructions 1324 may also reside, completely or at least partially, within the main memory 1304, within the static memory 1306, within the hardware processor 1302, or within the GPU 1303 during execution thereof by the machine 1300. In an example, one or any combination of the hardware processor 1302, the GPU 1303, the main memory 1304, the static memory 1306, or the mass storage device 1316 may constitute machine-readable media.

While the machine-readable medium 1322 is illustrated as a single medium, the term "machine-readable medium" may include a single medium, or multiple media, (e.g., a centralized or distributed database, and/or associated caches and servers) configured to store the one or more instructions 1324.

The term "machine-readable medium" may include any medium that is capable of storing, encoding, or carrying instructions 1324 for execution by the machine 1300 and that cause the machine 1300 to perform any one or more of the techniques of the present disclosure, or that is capable of storing, encoding, or carrying data structures used by or associated with such instructions 1324. Non-limiting machine-readable medium examples may include solid-state memories, and optical and magnetic media. In an example, a massed machine-readable medium comprises a machine-readable medium 1322 with a plurality of particles having invariant (e.g., rest) mass. Accordingly, massed machine-readable media are not transitory propagating signals. Specific examples of massed machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1324 may further be transmitted or received over a communications network 1326 using a transmission medium via the network interface device 1320.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computer-implemented method comprising:
   tracking user activity for a plurality of users while interacting with a same webpage to obtain session replay data;
   analyzing the session replay data to obtain a plurality of states for the same webpage, wherein each state corresponds to a different view of the same webpage based on a different interaction of the users with the same webpage;
   causing presentation of a first user interface (UI) for selecting one state from the plurality of states;
   receiving a selection of a first state from the plurality of states;
   causing presentation of a second UI for configuring tracking options to track the first state while users viewing the same webpage are in the first state;
   receiving, in the second UI, tracking options values for the first state;
   analyzing views of the first state of the same webpage based on the tracking options values; and
   causing presentation of performance metrics associated with the first state based on the analyzed views.

2. The method as recited in claim 1, wherein a first state corresponds to an initial view of the same webpage when loaded on a browser, wherein a second state corresponds to a view of the same webpage after selection of a menu in the same webpage.

3. The method as recited in claim 1, wherein the tracking options comprises a configurable scroll-level threshold to define when a webpage is considered exposed to the user for calculating the performance metrics.

4. The method as recited in claim 1, wherein the performance metrics comprise an exposure rate, wherein a zone is considered as being exposed when a vertical middle point of the zone is presented on the user interface.

5. The method as recited in claim 1, wherein the performance metrics comprise a percentage of users selecting an option to subscribe to a newsletter, wherein the performance metrics comprise an average hover time describing an average amount of time a mouse cursor hovers over a zone.

6. The method as recited in claim 1, wherein each zone refers to content elements, fields, and other web components that form user-facing portions of the webpage.

7. The method as recited in claim 1, wherein causing presentation of the performance metrics comprises:
   overlaying a value of at least one performance metric over a zone on the webpage.

8. The method as recited in claim 1, wherein causing presentation of the performance metrics comprises:
   presenting zone information for zones nested inside another zone in the same webpage.

9. The method as recited in claim 1, wherein causing presentation of the first UI for selecting one state from the plurality of states comprises:
   presenting the plurality of states of the same webpage in the first UI; and
   enabling a selection of any of the presented states.

10. The method as recited in claim 1, wherein, one state of the same webpage corresponds to a state resulting from a user selecting a pull-down menu in the webpage.

11. A system comprising:
    a memory comprising instructions; and
    one or more computer processors, wherein the instructions, when executed by the one or more computer processors, cause the system to perform operations comprising:

tracking user activity for a plurality of users while interacting with a same webpage to obtain session replay data;
analyzing the session replay data to obtain a plurality of states for the same webpage, wherein each state corresponds to a different view of the same webpage based on a different interaction of the users with the same webpage;
causing presentation of a first user interface (UI) for selecting one state from the plurality of states;
receiving a selection of a first state from the plurality of states;
causing presentation of a second UI for configuring tracking options to track the first state while users viewing the same webpage are in the first state;
receiving, in the second UI, tracking options values for the first state;
analyzing views of the first state of the same webpage based on the tracking options values; and
causing presentation of performance metrics associated with the first state based on the analyzed views.

12. The system as recited in claim 11, wherein a first state corresponds to an initial view of the same webpage when loaded on a browser, wherein a second state corresponds to a view of the same webpage after selection of a menu in the same webpage.

13. The system as recited in claim 11, wherein the tracking options comprises a configurable scroll-level threshold to define when a webpage is considered exposed to the user for calculating the performance metrics.

14. The system as recited in claim 11, wherein the performance metrics comprise an exposure rate, wherein a zone is considered as being exposed when a vertical middle point of the zone is presented on the user interface.

15. A non-transitory machine-readable storage medium including instructions that, when executed by a machine, cause the machine to perform operations comprising:

tracking user activity for a plurality of users while interacting with a same webpage to obtain session replay data;
analyzing the session replay data to obtain a plurality of states for the same webpage, wherein each state corresponds to a different view of the same webpage based on a different interaction of the users with the same webpage;
causing presentation of a first user interface (UI) for selecting one state from the plurality of states;
receiving a selection of a first state from the plurality of states;
causing presentation of a second UI for configuring tracking options to track the first state while users viewing the same webpage are in the first state;
receiving, in the second UI, tracking options values for the first state;
analyzing views of the first state of the same webpage based on the tracking options values; and
causing presentation of performance metrics associated with the first state based on the analyzed views.

16. The non-transitory machine-readable storage medium as recited in claim 15, wherein a first state corresponds to an initial view of the same webpage when loaded on a browser, wherein a second state corresponds to a view of the same webpage after selection of a menu in the same webpage.

17. The non-transitory machine-readable storage medium as recited in claim 15, wherein the tracking options comprises a configurable scroll-level threshold to define when a webpage is considered exposed to the user for calculating the performance metrics.

18. The non-transitory machine-readable storage medium as recited in claim 15, wherein the performance metrics comprise an exposure rate, wherein a zone is considered as being exposed when a vertical middle point of the zone is presented on the user interface.

\* \* \* \* \*